Jan. 20, 1959  R. V. OSTERHOUT ET AL  2,869,466
REMOTE CONTROL FOR PIPELINE PUMPING ENGINES
Filed Aug. 3, 1955  3 Sheets-Sheet 1
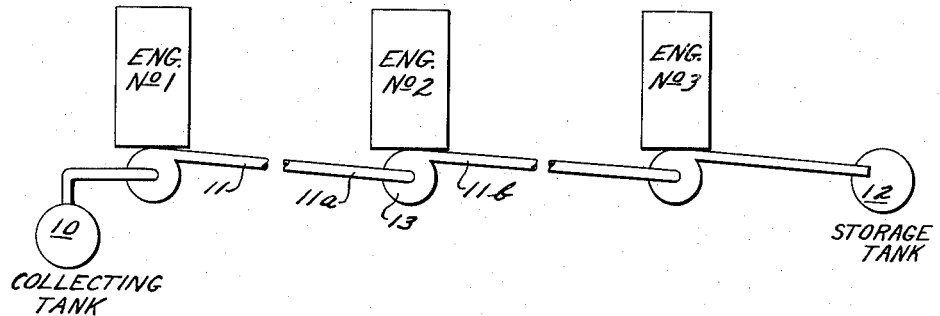
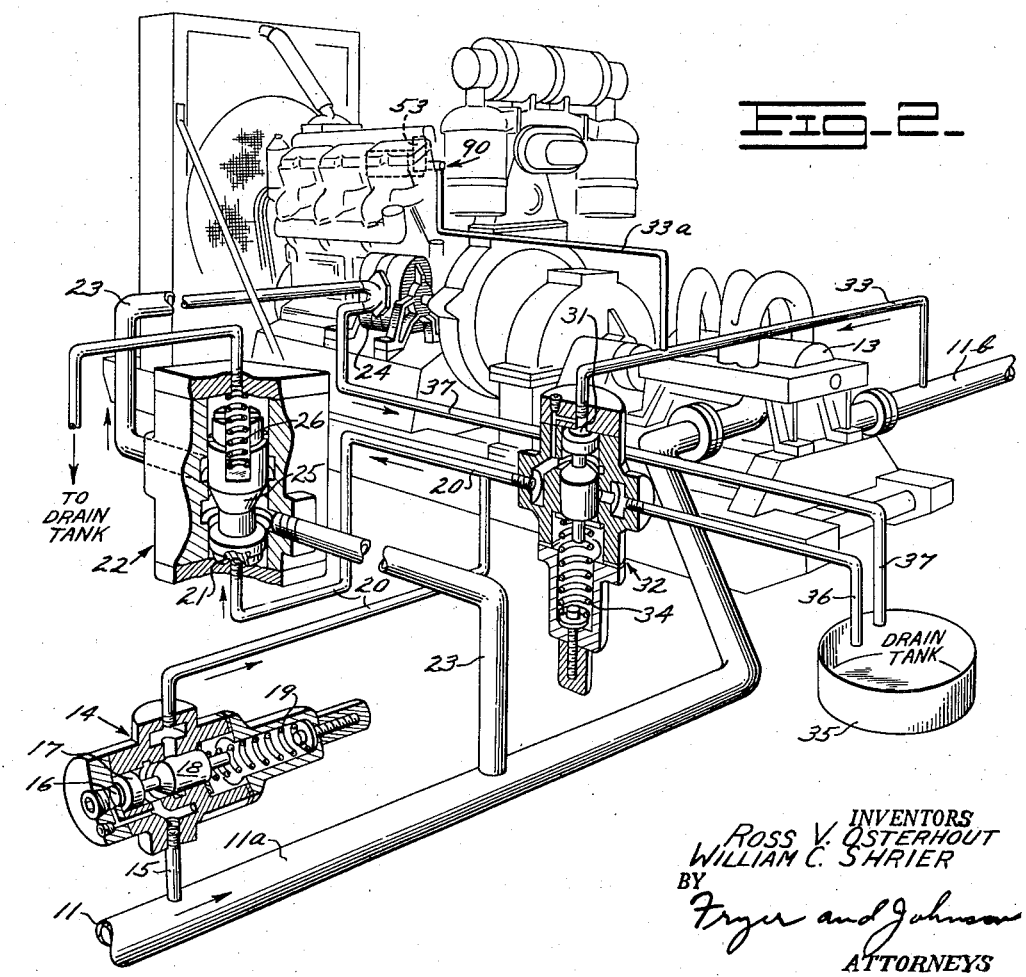
INVENTORS
ROSS V. OSTERHOUT
WILLIAM C. SHRIER
BY
Fryer and Johnson
ATTORNEYS

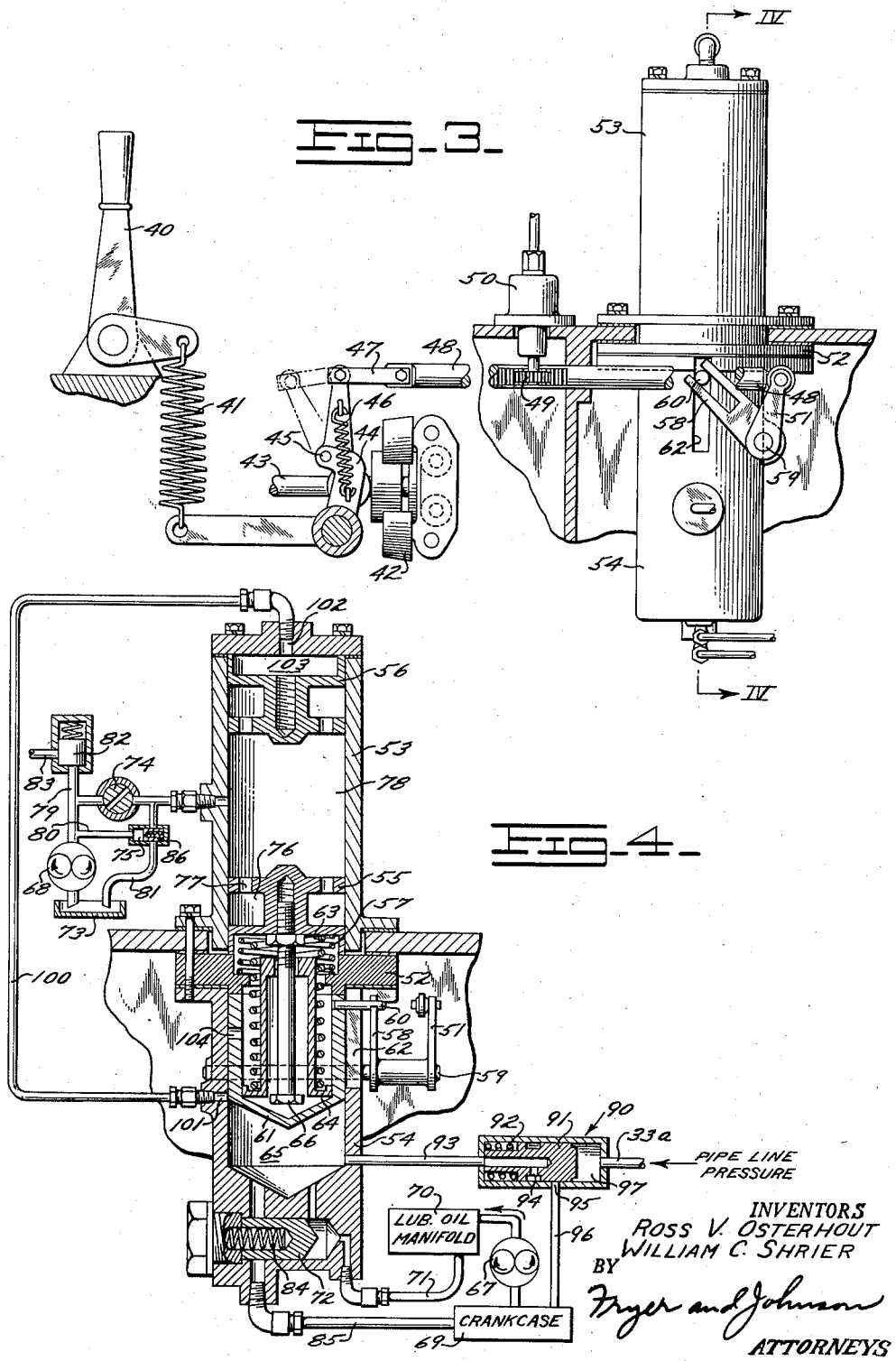

Jan. 20, 1959  R. V. OSTERHOUT ET AL  2,869,466
REMOTE CONTROL FOR PIPELINE PUMPING ENGINES
Filed Aug. 3. 1955  3 Sheets-Sheet 3
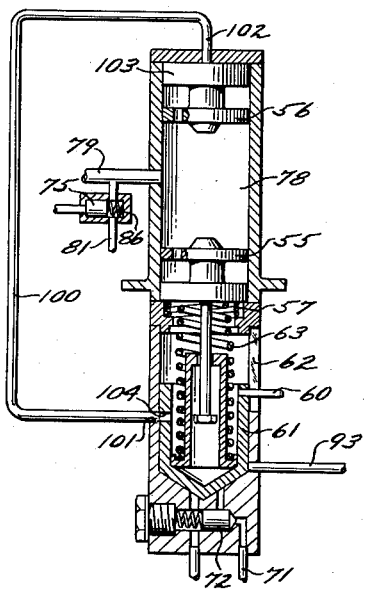
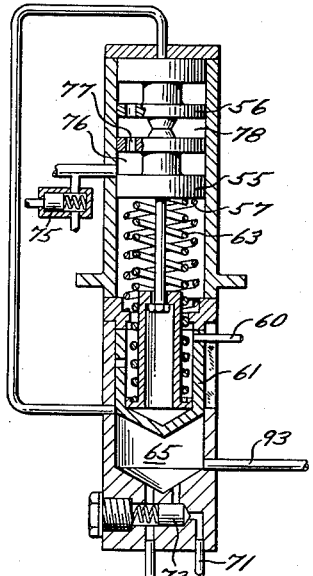
INVENTORS
ROSS V. OSTERHOUT
WILLIAM C. SHRIER
BY
*Fryer and Johnson*
ATTORNEYS

United States Patent Office 2,869,466
Patented Jan. 20, 1959

2,869,466

REMOTE CONTROL FOR PIPELINE PUMPING ENGINES

Ross V. Osterhout, Fort Worth, Tex., and William C. Shrier, Peoria, Ill., assignors to Caterpillar Tractor Co., Peoria, Ill., a corporation of California Application August 3, 1955, Serial No. 526,282

2 Claims. (Cl. 103—27)

This invention relates to a remote control for the starting and stopping of several spaced engines which drive separate pumps connected to a common fluid transmission pipeline. More specifically, the invention relates to a control and means for starting and stopping several pumping engines used with a fluid transmission pipeline wherein the control is responsive to changes of fluid pressure within the pipeline, and the starting means is powered by the pressure of the fluid in the pipeline.

In transporting a fluid, such as crude oil or a derivative, by means of a pipeline, it is a common practice to employ a plurality of pumps at regularly spaced stations along the line. The distance between the individual pumping stations is determined by the size of the pumps, the type of power available to drive the pumps, the rate at which it is desired to move the fluid, the fluid pressure in the pipeline, and other factors peculiar to fluid transmission pipelines.

When internal combustion engines are used to drive the pumps, various methods are employed to start and to stop the individual engines at the desired synchronized point of time. Examples of these methods are: a manually controlled start and stop for the engine at each pumping station with synchronization of all units occurring upon a signal to the personnel operating the engines; an electrically controlled start-and-stop system operative from one, or several, of the stations; a remote control system using air pressure as the power means. Each of these methods has an unsatisfactory feature. The manual method requires personnel to stand-by at all times, as well as continual maintenance of a communication system; the electrical and the air systems both require external sources of power to effect starting and stopping of the engines as well as synchronization of starting and stopping times.

Therefore, it is an object of this invention to provide a remote control system for starting and stopping a plurality of internal combustion engines which are used to drive spaced pumps in a fluid transmission pipeline, said control being responsive to changes of fluid pressure in the transmission line and adapted to use fluid under pressure from the pipeline as a source of power to start and to stop engines thereby requiring no external power supply.

More specifically, the invention provides separate means for starting and separate means for stopping pumping engines, associated with a fluid transmission pipeline, and an arrangement of valves which admit the pipeline fluid to and vent fluid from both means in response to a change of pipeline fluid pressure which may be controlled from a point remote from the pumping engines.

Another object of the invention is to provide an engine, which drives a pump associated with a fluid transmission pipeline, with a fluid starting motor utilizing the pipeline fluid as a source of power and control valve means responsive to a predetermined change of pipeline fluid pressure to start the engine, and also to provide the engine with an automatically resettable stopping means and control valve means responsive to another predetermined change of pipeline fluid pressure to stop the engine.

In the drawings:

Fig. 1 is a schematic view of a fluid transmission pipeline such as those commonly used to transmit oil to a refinery from a collecting point near a group of producing wells, Fig. 2 is a perspective view of one of the remotely controlled engines equipped with a fluid starting motor and driving a pump connected in series with the fluid transmission pipeline; the pilot operated valves which direct fluid to the starting and stopping mechanism are shown either in cross-section or with parts broken away and at an enlarged scale, Fig. 3 is a partial view of the engine governor, the governor control, the rack bar associated with one of the fuel injection pumps of the metering type, and the remotely controlled mechanism used to stop the engine, Fig. 4 is a cross-sectional view taken on line IV—IV of Fig. 3 showing the component parts of the engine shutdown mechanism in an operating condition with the shutdown being reset and in a fully-cocked position, Fig. 5 is a view like a portion of Fig. 4 showing the shutdown mechanism in a position to stop the engine;

Fig. 6 is the same as Fig. 5, showing the mechanism in a reset, but uncocked position.

Referring to Fig. 1, a fluid transmission pipeline provided with spaced pumping units is schematically illustrated. Several pumping stations are spaced at appropriate distances in relation to pumping capacity and volume to be transmitted, and each station is shown comprising a diesel engine driving a suitable pump. All of the engines, except the one nearest the collecting tank, are provided with a remotely controlled starting and stopping system. Crude oil from several oil wells may be pumped to a common collecting point, indicated by tank 10. The crude oil is then to be transmitted through a pipeline 11 of suitable capacity to a refinery or other desired terminal point schematically represented at 12. The distance between the collecting tank and the refinery is usually greater than a distance which a single pump can move the oil at a satisfactory rate; consequently, more than one pumping unit must be used and the additional units must be appropriately spaced from each other at distances proportionate to the pump capacity and the desired rate of oil movement. Since operation of the pipeline is intermittent rather than continuous, some method of synchronized starting and stopping of all the pumping units must be provided.

An initial or master pumping unit indicated by engine pump No. 1, is installed at the beginning of the transmission pipeline 11 and is controlled manually. All of the subsequent slave pumping units, indicated by Nos. 2 and 3, which are shown connected in series with engine No. 1, are equipped with a remotely controlled starting and stopping system. The speed governors of engines Nos. 2 and 3 may be adjusted manually at any time prior to or during pumping operation of the pipeline. The speed governor of engine No. 1, may be adjusted manually to effect an increase or decrease in the fluid pressure in the pipeline at point 11a, thereby remotely controlling the starting and the stopping of the slave engines Nos. 2 and 3 in a manner which will be described below.

Fig. 2 shows one of the slave engines provided with the invention; both engines Nos. 2 and 3 are equipped identically to the engine shown in Fig. 2. When a pipeline requires additional slave engines, they will be equipped with the same remotely controlled starting and stopping system as Nos. 2 and 3.

The pump 13 of each slave unit is connected in series with the pipeline 11. The intake or suction side of the pump is in communication with a starting-cycle initiator valve 14 by means of a conduit 15. Fluid under pressure in the pipeline at point 11a is thereby transmitted to a pressure chamber 16 at one end of the initiator valve 14 and bears against a pilot piston 17 integral with a flow-control valve spool 18. A biasing spring 19 at the other end of the valve spool resists the pressure of the oil in the pilot pressure chamber and may be adjusted to permit opening of the initiator valve at a predetermined pressure in the pipeline which has been transmitted to the pilot chamber by conduit 15. Thus a sufficient pressure in the pipeline 11, and consequently in the pilot chamber 16, will move the valve spool 18 to the right and admit oil to a conduit 20 which is in communication with a pilot pressure chamber 21 of a starting valve 22. A conduit 23 connecting the pipeline 11 and a conventional fluid motor 24 is normally closed by a flow-control valve spool 25 of the starting valve. A biasing spring 26 is provided to hold the valve spool 25 in a closed position until the initiator valve 14 has admitted oil to the pilot pressure chamber 21 to open the starting valve 22.

Upon pipeline pressure at point 11a reaching a predetermined value, the initiator valve is moved to the right as viewed in Fig. 2 and permits fluid at pipeline pressure to be transmitted to the pilot chamber 21 of the starting valve 22 via conduit 20. The fluid in chamber 21 moves the valve spool 25 upwardly, thereby opening the starting valve 22 and admitting pipeline fluid to the starting motor 24 through the conduit 23. The slave engine is thus cranked by the motor 24 and started in a conventional manner. If the speed responsive governor provided on the engine has been adjusted prior to starting, the slave engine will operate at that selected speed.

As soon as the slave engine No. 2 has started, the pump 13, which is driven by the engine, will cause a pressure differential between the pump intake side at point 11a and the discharge or pressure side 11b. The decrease in fluid pressure occurring on the intake side at 11a will permit the biasing spring 19 of the initiator valve 14 to close the initiator valve. The higher pressure at the discharge side 11b will be directed to a pilot chamber 31 of a starting cycle terminator valve 32 by means of a conduit 33. A biasing spring 34 which holds the terminator valve in a normally closed position is adjusted to permit opening of this valve upon starting of the pump 13 and a high pressure occurring at 11b. As soon as the terminator valve 32 opens, the fluid in line 20 is relieved of pressure and the starting motor valve 22 is closed by the force of the spring 26. The flow of oil through conduit 23 to the starting motor is thereby shut off and the starting cycle is terminated.

The oil from conduit 20 is vented by the terminator valve to a drain tank 35 by means of a drain line 36. The oil flowing through the starting motor 24 is likewise directed to the drain tank by a drain line 37. If the slave engine is adapted to operate on the fluid being pumped through the transmission line 11, the drain tank 35 may serve as a fuel reservoir.

In Figs. 3 and 4, portions of the engine governor and fuel control system are shown associated with an engine shutdown mechanism adapted to shut off the fuel to a diesel engine upon either a loss of engine lubricating oil pressure or a decrease in the fluid pressure in the pipeline 11. This engine shutdown mechanism is fully disclosed and described in our assignee's Patent No. 2,719,521, issued October 4, 1955. In that application, the shutdown mechanism is shown also provided with an overspeed governor adapted to shut off the fuel to the engine upon exceeding a predetermined speed. The overspeed portion of the shutdown mechanism is neither shown nor described herein and is not necessary for satisfactory operation of this invention.

The principal elements of a diesel engine fuel control mechanism are shown in Fig. 3 including a governor adjusting handle 40, a governor spring 41, a pair of flyweights 42 carried on a shaft 43 driven by the engine through means not shown, and a fuel rate adjusting lever 44. The lever 44 is a two-piece lever pivoted at 45 and normally held in a rigid condition by a spring 46 to permit positioning of the lever 44 in response to the resultant force of the governor spring 41 and the flyweights 42. A link 47 connects the fuel rate adjusting lever 44 to a rack bar 48 which meshes with gears 49 on each of a plurality of fuel pumps, one of which is shown at 50. The fuel pump 50 meters the amount of fuel injected per engine cycle by being angularly adjusted through movement of the rack bar 48. This fuel control mechanism is disclosed in the Patent No. 2,719,521 referred to and with it movement of the rack bar toward the right increases the amount of fuel injected per engine cycle while movement thereof to the left decreases the amount of fuel injected per engine cycle and eventually results in all fuel being shut off and stopping of the engine.

A bellcrank 51 of the engine shutdown mechanism contacts one end of the rack bar 48 preferably through an anti-friction roller as shown, and counter-clockwise movement of this bellcrank in response to the engine shutdown mechanism, will move the rack bar to the left, as viewed in Fig. 3, overcoming the tension of the spring 46 to cock the lever 44 and permit the engine to be shut down.

The lever 44 with its spring 46 is herein illustrated as one means for permitting the rack bar 48 to move toward the left to accomplish shutdown of the engine without overcoming the tendency of the main governor with its spring 41 to oppose such motion. There are various other devices for accomplishing this purpose any of which may be used with the present invention.

The shutdown mechanism of the present invention includes, as best shown in Fig. 4, an elongated cylinder made up of a central portion 52, an upper portion 53, and a lower portion 54. A pair of pistons 55 and 56 are slidable in the upper portion 53, and are urged toward the top of the cylinder when the engine is shut down under the influence of a spring 57 interposed between the member 52 which has a portion projecting into the cylinder and the lower end of the piston 55. A bifurcated arm 58 of bellcrank 51 which is journaled on a shaft 59, embraces a pin 60 carried on a piston 61 also slidable within the lower portion 54 of the cylindrical housing. A slot 62 in the housing permits sliding movement of the pin 60 and rocking of the bellcrank 51 about the shaft 59 as the piston 61 moves downwardly. Thus the bellcrank 51 is rocked in a counter-clockwise direction to move the rack bar 48 to an extreme position to the left and shut down the engine.

A spring 63 is disposed between the lower flange of a retainer 64 and the under surface of the piston 55 and serves to urge the piston 61 downwardly in the absence of oil pressure in chamber 65. This retainer 64 is piloted on a cap screw 66, the upper end of which is threaded into the piston 55. This cap screw acts as a stop to prevent the spring from exerting a downward force on the piston 61 when the piston 55 is in an upward position as shown in Fig. 6.

The hydraulic circuit for the shutdown mechanism is diagrammatically shown in Fig. 4 as comprising a pair of separate engine driven pumps 67 and 68. The pump 67 draws lubricant from the engine crankcase 69 directing it to a lubrication oil manifold 70. From the manifold, the lubricant flows through a conduit 71 to the pressure chamber 65 in the lower portion 54 of the cylindrical housing which it enters through a spring loaded check valve 72.

Meanwhile the pump 68 is supplying oil under pressure from a separate reservoir 73 to the upper portion 53 of the cylindrical housing through a rotating metering orifice 74, the central element of which is driven by gears not shown which are connected with a convenient moving part of the engine or the pump 68. A spring loaded relief valve 75 permits upward movement of the piston 55 when the engine is shut down as will presently appear.

Before starting the engine, the governor control handle 40 shown in Fig. 3 is rocked in a counter-clockwise direction to tension spring 41 and rock the lever 44 to move the rack bar 48 to the right. This movement of the rack bar to the right rocks the bellcrank 51 in a clockwise direction about shaft 59 and, by means of the bifurcated arm 58 and pin 60, raises the piston 61 to the position shown in Fig. 6.

When the engine starts, oil under pressure from the pump 68 is metered through the rotating orifice 74 and enters an annulus 76 which circumscribes the piston 55. This oil flows upwardly through an orifice 77 in the piston into the space 78 between pistons 55 and 56 and thus urges the piston 55 downwardly. The pressure from the pump 68 enters passages 79 and 80 (Fig. 4), and urges the valve element 75 toward the right to block the return conduit 81. When the piston 55 has reached the lower limit of its travel in the cylinder portion 53, pressure continues to build up in line 79 until a spring loaded valve element 82 is urged upwardly to permit the escape of lubricant to the conduit 83 by means of which it is directed to other conduits (not shown) to serve as a lubricant for other parts such as the governor and the fuel pump cam shaft.

As the engine starts, fluid under engine lubricating oil pressure also enters chamber 65 at the lower end of the cylinder through the check valve 72, thus preventing downward movement of piston 61 under influence of the spring 63. This condition is shown in Fig. 4. When there is a failure of pressure in the engine lubricant system, a spring 84 urges check valve 72 to the right and permits fluid in chamber 65 to return to the engine crankcase through conduit 85 when the spring 63 moves piston 61 downwardly to rock the bellcrank 51 in a counter-clockwise direction to shut the engine down. This of course also results in shut down of the engine driven pump 68. When the pump 68 is no longer delivering fluid under pressure into the conduit 80, a spring 86 urges the valve element 75 toward the left to permit escape of fluid from the space 78 through the conduit 81.

As the lubricating oil escapes from the space 78, the piston 55 moves upwardly and the preload on spring 63 is reduced so that the piston 61 may be returned to the position shown in Fig. 6, thus resetting the shutdown mechanism automatically. The spring 46 also returns the cocked lever 44 from the position shown in phantom lines to the solid line position to move the rack bar 48 to the right to adjust the fuel pumps and permit starting of the engine upon a subsequent cranking cycle by the fluid motor 24.

The shutdown mechanism has been described above as operating in response to a loss of pressure in the engine lubricating oil system. With the present remote start and stop control, this shutdown mechanism has been provided with a drain valve 90 which simulates a loss of lubricating oil by venting chamber 65 and acts as a trigger to set off the shut down mechanism.

The drain valve 90 is provided with a slidable valve element 91 which is urged toward the open position by a spring 92 to establish communication between chamber 65 and the crankcase by means of a vent line 93, valve port 94, exhaust vent 95 and drain line 96. A pilot pressure chamber 97 to valve 90 is connected to the pipeline 11 at point 11b by way of pressure line 33 and line 33a as shown in Fig. 2. Thus fluid at pipeline pressure in chamber 97 overcomes the force of spring 92 and holds the valve element 91 in a closed position as shown in Fig. 4. When the pressure in the pipeline 11 is lowered a predetermined amount by decreasing the speed of the master engine, No. 1, or by stopping engine No. 1, the resulting pressure drop will be reflected at chamber 97 thus allowing spring 92 to open the drain valve and set off the shutdown mechanism.

A conduit 100 is disposed between an outlet 101 in the lower end of the cylinder and an inlet 102 in the top of the cylinder in order to permit operation of the engine and the shutoff mechanism in the event of failure of the pump 68. As the engine rack is moved to the increased fuel position and the piston 55 is moved upwardly as disclosed in Fig. 6, the piston 61 uncovers a portion of the outlet 101 and lubricant can flow through the conduit 100 and into a chamber 103 above the piston 56. Under normal conditions with the pump 68 operating, pressure in the chamber 78 is sufficient to hold the piston 56 at the top of the cylinder. However, with the pump 68 inoperative, lubricating oil in the chamber 103 forces the piston 56 and the piston 55 downwardly to load the spring 63 of the shutoff mechanism in the manner previously described.

In the event of failure of engine oil pressure or opening of drain valve 90, in response to a decrease in pipeline pressure, the piston 61 moves downwardly and blocks the inlet 101, but after the piston 61 has moved downwardly as far as possible, an aperture 104 in the wall of a piston 61 registers with the inlet 101 (Fig. 5). Then oil from chamber 103 above piston 56 flows through conduit 100 and aperture 104 into the interior of piston 61 from which it may escape through the slot 62 in the housing. This permits the pistons 55 and 56 to move upwardly to the positions disclosed in Fig. 6 as the shutdown mechanism is reset by the action of spring 57 and spring 46.

The several positions occupied by the parts within the cylinder are shown in Figs. 4, 5, and 6. In Fig. 4, the parts are shown with the slave engine operating, the shutdown piston 61 is held in a raised position by pressure of engine lubricating oil in chamber 65, and the actuating spring 63 is fully compressed by oil in chamber 78. The drain valve 90 is held in a closed position by pipeline fluid in chamber 97.

In Fig. 5, the parts are shown just after a shut-down. The actuating spring 63 has moved the piston 61 downwardly upon either the remotely controlled drain valve 90 or the emergency shutdown valve 72 being opened and venting chamber 65. The piston 61, through the pin 60 and bell-crank 51 has moved the rack bar to the shutdown position.

In Fig. 6, the parts are shown after a shutdown with the reset spring 57 having raised piston 55 and the spring 46 of Fig. 3 having moved the piston 61 upwardly through the rack bar 48 and the bellcrank 51. The engine is now ready for another start. Upon the above engine starting, an increase in pipeline pressure at point 11b will result to close drain valve 90 before the metering orifice 74 has permitted sufficient oil to accumulate in chamber 78 and compress the actuating spring 63.

Thus an increase in pipeline pressure, which can be controlled by increasing the speed of the master engine, will automatically start a slave engine by means of a fluid starting motor connected to the pipeline and by means of valves responsive to a predetermined change in the fluid pressure in the pipeline. An increase in pressure in pipeline 11 opens the pilot-operated initiator valve 14 admitting pipeline fluid to the pilot chamber 21 of the starting valve 22. The starting valve is opened in response to this fluid, establishing communication between the pipeline 11 and the fluid starting motor 24 to crank and start the slave engine. As described above, the pump 13 associated with the slave engine, causes a decrease in pressure at point 11a in the pipeline to permit closing of initiator valve 14; the pump 13 also causes an increase in pressure at point 11b to open the terminator valve 32 which vents and closes the starting valve 22 to terminate the starting cycle.

This increase in pressure at 11b is transmitted to the shutdown drain valve 90 by line 33 to close this valve and prevent operation of the shutdown mechanism. Should it be desired subsequently to shut down engine No. 2, the speed of the master engine No. 1 is decreased to cause a predetermined decrease in pressure at point 11b and consequently in the pilot chamber 97 of the shut down drain valve 90. The spring 92 moves the valve element 91 to the open position to vent chamber 65 and set off the shutdown mechanism.

If the slave pumping engine units are connected in series with the master engine as schematically shown in Fig. 1, the master engine (No. 1) can control the starting of slave engine (No. 2) and the resulting increase in fluid pressure on the discharge side of the pump of unit No. 2 will cause the subsequent opening of the initiator valve 14 of unit No. 3 to start this unit. If several units are used in series, a chain reaction will occur in response to changes in pipeline fluid pressure controlled at the master engine, and engines No. 3, No. 4, etc., will be started successively.

In like manner, the slave engines are stopped in a chain reaction resulting from a decrease in pipeline fluid pressure at the master engine.

We claim:

1. Starting means for a series of slave engines actuating pumps spaced throughout the length of a fluid transmission line which comprises a fluid driven starting motor on each slave engine to be started, a master engine in advance of those to be started, a conduit communicating between the transmission line in advance of each slave engine and the starting motor thereof whereby fluid in the tranmission line may be employed to drive the starting motor and start the slave engine, a normally closed pressure actuated starting valve in said conduit, a second conduit communicating between the transmission line and the pressure actuated valve, and an initiator valve in said second conduit responsive to pressure in the transmission line to admit fluid pressure to the pressure actuated valve to open it and permit flow of transmission line pressure to the starting motor, whereby variations of the speed of the master engine and its pump will effect starting of the other engines.

2. Starting means for a series of slave engines actuating pumps spaced throughout the length of a fluid transmission line which comprises a fluid driven starting motor on each slave engine to be started, a master engine in advance of those to be started, a conduit communicating between the transmission line in advance of each slave engine and the starting motor thereof whereby fluid in the transmission line may be employed to drive the starting motor and start the slave engine, a normally closed pressure actuated starting valve in said conduit, a second conduit communicating between the transmission line and the pressure actuated valve, an initiator valve in said second conduit responsive to pressure in the transmission line to admit fluid pressure to the pressure actuated valve to open it and permit flow of transmission line pressure to the starting motor, whereby variations of the speed of the master engine and its pump will effect starting of the other engines, a vent line communicating with said second conduit, a normally closed pressure responsive terminator valve in said vent line, and a conduit connecting the transmission line on the discharge side of the slave engine pump with said terminator valve whereby a rise in pressure on the said discharge side will open the terminator valve to reduce pressure at the starting valve and thereby discontinue flow to the starting motor.

References Cited in the file of this patent

UNITED STATES PATENTS

| | | |
|---|---|---|
| 1,083,568 | Ungar | Jan. 6, 1914 |
| 1,184,615 | Brower | May 23, 1916 |
| 1,390,829 | Smoot | Sept. 13, 1921 |
| 1,529,693 | Dennis | Mar. 17, 1925 |
| 1,621,221 | Pogue | Mar. 15, 1927 |
| 1,873,045 | Saathoff | Aug. 23, 1932 |
| 2,330,755 | Smith | Sept. 28, 1943 |
| 2,339,957 | Smith | Jan. 25, 1944 |